US008347382B2

(12) United States Patent
DeLuca et al.

(10) Patent No.: US 8,347,382 B2
(45) Date of Patent: Jan. 1, 2013

(54) MALICIOUS SOFTWARE PREVENTION USING SHARED INFORMATION

(75) Inventors: Lisa S. DeLuca, San Francisco, CA (US); Kulvir S. Bhogal, Pflugerville, TX (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/640,727

(22) Filed: Dec. 17, 2009

(65) Prior Publication Data

US 2011/0154490 A1 Jun. 23, 2011

(51) Int. Cl.
*G06F 11/30* (2006.01)
*G06F 12/14* (2006.01)
*G06F 12/16* (2006.01)
*G08B 23/00* (2006.01)

(52) U.S. Cl. ............. 726/22; 726/23; 726/24; 715/764; 713/188

(58) Field of Classification Search .................... 726/22, 726/23, 24; 715/764; 713/188
See application file for complete search history.

(56) References Cited

U.S. PATENT DOCUMENTS

| | | | |
|---|---|---|---|
| 7,325,251 B1 | 1/2008 | Szor | |
| 7,472,420 B1 * | 12/2008 | Pavlyushchik | 726/24 |
| 7,558,797 B2 | 7/2009 | Li | |
| 7,594,272 B1 * | 9/2009 | Kennedy et al. | 726/24 |
| 7,640,590 B1 * | 12/2009 | McCorkendale et al. | 726/25 |
| 7,743,254 B2 * | 6/2010 | Sauve et al. | 713/175 |
| 7,822,620 B2 * | 10/2010 | Dixon et al. | 705/1.1 |
| 7,895,448 B1 * | 2/2011 | Satish | 713/188 |
| 7,941,850 B1 * | 5/2011 | Satish | 726/22 |
| 8,099,784 B1 * | 1/2012 | Chen et al. | 726/23 |
| 2002/0162015 A1 * | 10/2002 | Tang | 713/200 |
| 2003/0200541 A1 * | 10/2003 | Cheng et al. | 717/169 |
| 2005/0132227 A1 * | 6/2005 | Reasor et al. | 713/201 |
| 2005/0132358 A1 * | 6/2005 | Peev et al. | 717/174 |
| 2005/0210285 A1 * | 9/2005 | Williams | 713/201 |
| 2005/0229104 A1 * | 10/2005 | Franco et al. | 715/743 |
| 2006/0123413 A1 * | 6/2006 | Collet et al. | 717/174 |
| 2006/0200702 A1 * | 9/2006 | Canning et al. | 714/38 |
| 2006/0242712 A1 * | 10/2006 | Linn et al. | 726/26 |
| 2007/0006302 A1 * | 1/2007 | Donnelly et al. | 726/22 |
| 2007/0038677 A1 | 2/2007 | Reasor et al. | |
| 2007/0067844 A1 * | 3/2007 | Williamson et al. | 726/24 |
| 2008/0072049 A1 * | 3/2008 | Cross et al. | 713/176 |

(Continued)

OTHER PUBLICATIONS

Rhea et al., "OpenDHT: A Public DHT Service and Its Uses", ACM Digital Library, Aug. 2005, pp. 73-88.
Parekh et al., "Privacy-Preserving Payload-Based Correlation for Accurate Malicious Traffic Detection", SIGCOMM'06 Workshops, Sep. 11-15, 2006, Pisa, Italy, pp. 99-109.

(Continued)

*Primary Examiner* — Michael Simitoski
(74) *Attorney, Agent, or Firm* — Yee & Associates, P.C.; Jeffrey S. LaBaw

(57) ABSTRACT

A method and apparatus for managing executable files. Responsive to detecting a request to run an executable file on a computer, a processor unit determines whether the executable file was downloaded to the computer within a period of time associated with a recent download. Responsive to a determination that the executable file was downloaded to the computer within the period of time, the processor unit determines whether feedback for the executable file from a number of users of the executable file is present in a repository. The feedback identified for the executable file in the repository is presented using a presentation system. User input as to whether the executable file should be run is prompted for by the processor unit after presenting the feedback.

24 Claims, 8 Drawing Sheets

U.S. PATENT DOCUMENTS

| | | | |
|---|---|---|---|
| 2008/0148403 | A1 | 6/2008 | Manion et al. |
| 2009/0038011 | A1* | 2/2009 | Nadathur ........................ 726/24 |
| 2009/0077664 | A1* | 3/2009 | Hsu et al. ........................ 726/24 |
| 2009/0138766 | A1* | 5/2009 | Rui et al. ........................ 714/57 |
| 2009/0165077 | A1* | 6/2009 | Heiner et al. ..................... 726/1 |
| 2010/0169976 | A1* | 7/2010 | Gurevich ........................ 726/26 |
| 2010/0192132 | A1* | 7/2010 | Yuan et al. ..................... 717/128 |

OTHER PUBLICATIONS

Wie et al., "An Efficient and Secure Code Sharing for Peer-to-Peer Communications", INSPEC/IEEE, 2006.

Sinjae et al., "P2P Trust Model: The Resource Chain Model", Dialog/Ei Compendex, Oct. 2007.

"Method for Blacklisting Software Versions to Prevent Execution", Lenovo, IBM Technical Disclosure Bulletin, Sep. 26, 2006.

* cited by examiner

MALICIOUS SOFTWARE PREVENTION USING SHARED INFORMATION

BACKGROUND

1. Field

The disclosure relates generally to an improved data processing system and, more specifically, to a method and apparatus for processing data. Still more particularly, the present disclosure relates to a method and apparatus for identifying potentially undesirable software.

2. Description of the Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. The Internet may carry information and provide services. The information and services include, for example, electronic mail, online chat services, file transfers, web pages, and other resources.

The Internet is a commonly used source of information and entertainment. Further, the Internet is also used as a medium for business activities. Many businesses, government entities, and other organizations have a presence on the Internet using websites to perform various transactions. Various organizations may offer goods and services. These goods and services may involve a sale of goods that are to be shipped to a customer. The goods also may be software and/or data purchased by a customer and transferred over the Internet to the customer.

Through the Internet, a user is able to obtain different types of software from many different sources. For example, a user may download word processor programs, CD burner programs, tool bars for browsers, spreadsheets, and other types of software applications from various sources. Some of these applications may contain malware. Malware is software that is designed to infiltrate or damage a computer without the consent of the owner of the computer.

For example, a user may locate a burner application to burn CDs or DVDs. With this example, the user downloads an executable file for the burner application. This executable file may be the burner application itself or a program that downloads other components for the burner application. The burner application may perform the task desired by the user. Additionally, however, the executable file also may install other software processes that run without the user's knowledge. This software takes the form of executable files in these examples. These processes may perform various undesirable tasks, such as recording user keystrokes, collecting information about user documents, obtaining address book contents, and other undesirable actions.

Thus, it would be advantageous to have a method and apparatus that addresses one or more of the issues discussed above, as well as possibly other issues.

SUMMARY

The illustrative embodiments provide a method and apparatus for managing executable files. Responsive to detecting a request to run an executable file on a computer, a processor unit determines whether the executable file was downloaded to the computer within a period of time associated with a recent download. Responsive to a determination that the executable file was downloaded to the computer within the period of time, the processor unit determines whether feedback for the executable file from a number of users of the executable file is present in a repository. Any feedback identified for the executable file in the repository is presented using a presentation system. User input as to whether the executable file should be run is prompted for by the processor unit after presenting the feedback.

DETAILED DESCRIPTION

Figure 1:
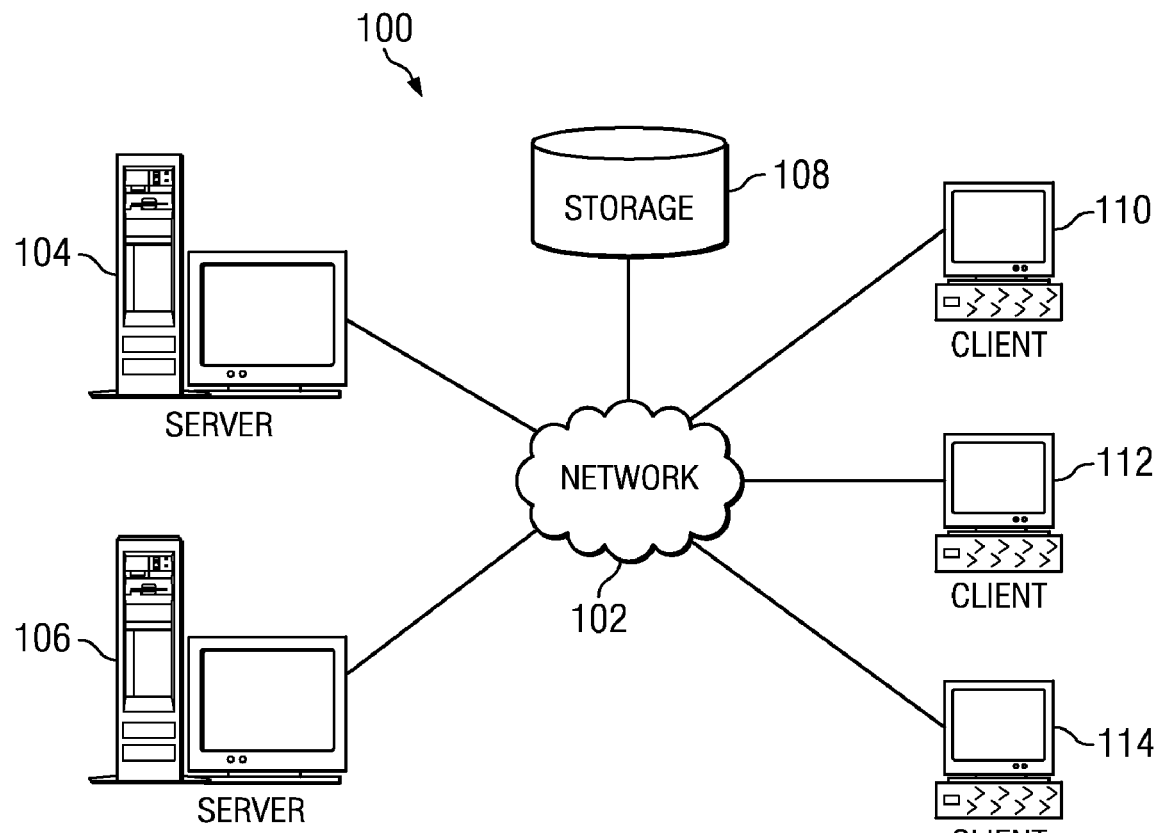
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
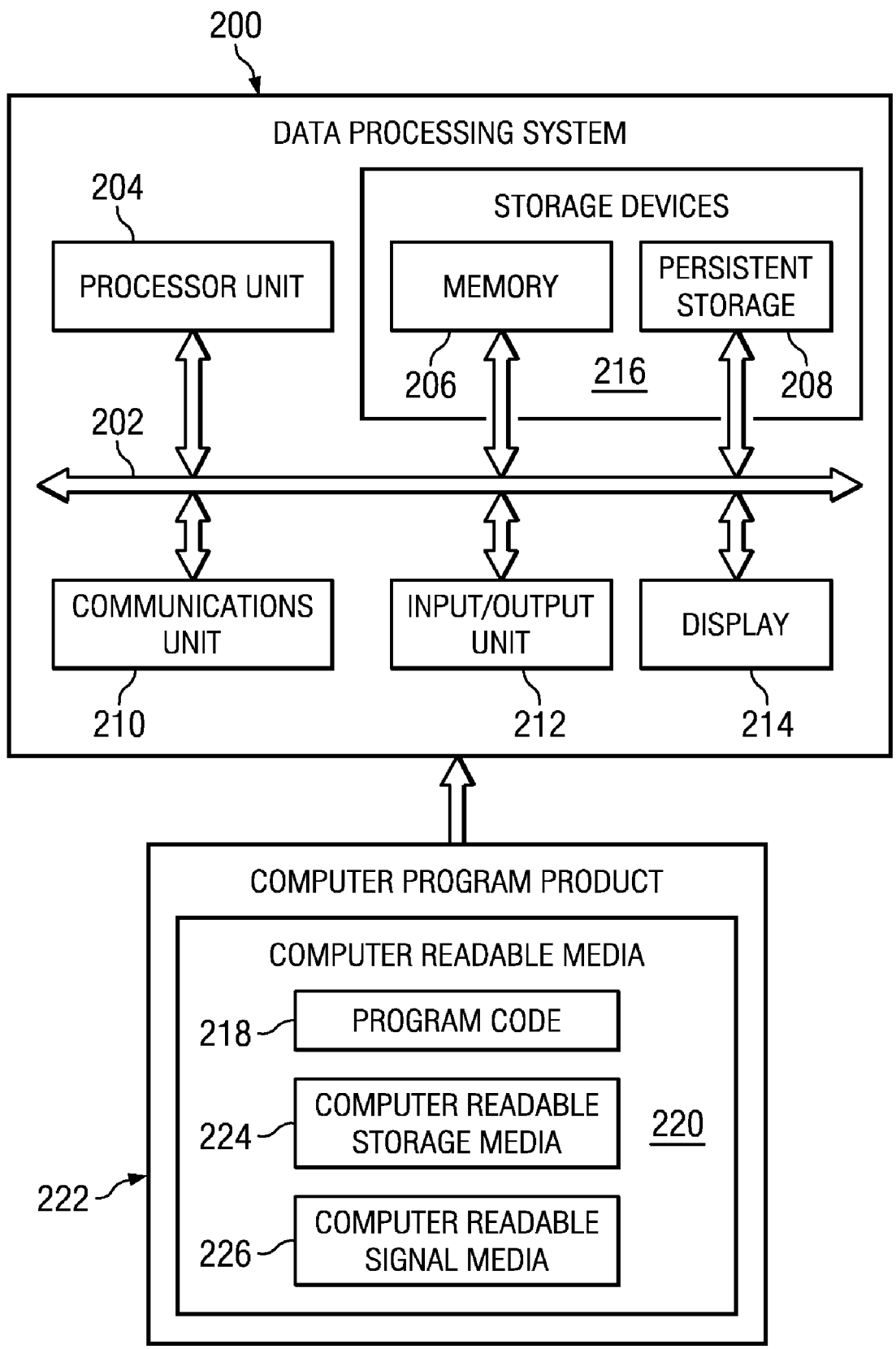
FIG. 2 is a diagram of a data processing system in accordance with an illustrative embodiment.

With reference now to the figures and, in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. For example, client computers 110, 112, and 114 may download software from server computer 104. Additionally, in the different illustrative embodiments, processes may run on client computers 110, 112, and 114 to manage executable files that may be downloaded from server computer 104. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 may be used to implement hardware for server computer 104, server computer 106, client computer 110, client computer 112, and client computer 114 in FIG. 1 in these illustrative examples.

Processor unit 204 serves to execute instructions for software that may be loaded into memory 206. Processor unit 204 may be a set of one or more processors or a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, data processing system 200 may be used to implement other types of data processing systems other than computers. For example, data processing system 200 may be used to implement a mobile phone, a set-top box, and/or some other suitable type of data processing system.

The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize and take into account a number of different considerations. For example, the different illustrative embodiments recognize and take into account that currently available malware protection processes collect information about a user system. These processes identify information about a user's system and use these configurations to determine whether an executable file may be considered malware. In these illustrative examples, an executable file is a file containing instructions that cause a computer to perform a number of tasks. A number, as used herein with reference to an item, means one or more items. An executable file may contain all of the code and other information needed to install a program. In other illustrative examples, an executable file may perform tasks to download components from the Internet or other sources to install a program. For example, a number of tasks is one or more tasks.

Other systems may include a database identifying executable files that have been identified as malware. These types of databases are downloaded from a source, such as a malware detection program provider. The different illustrative embodiments recognize and take into account that this type of database may not provide the most up to date or desired information needed by users to determine whether to run an executable file. For example, when a database is maintained by a single source or company, that organization has people that identify programs that may be malware. The different illustrative embodiments recognize and take into account that this type of process may be slower to identify the executable files that may contain malware. The different illustrative embodiments recognize that the users who download executable files may more quickly identify when malware is present.

Thus, the different illustrative embodiments provide a method and apparatus for managing executable files. In these illustrative examples, the executable files may be, for example, software installers that only run the first time to install an application. In response to taking requests to run an executable file on a computer, a determination is made as to whether the executable file was downloaded to the computer within a period of time associated with a recent download. In response to a determination that the executable file was downloaded to the computer within the period of time, a determination is made as to whether feedback for the executable file from a number of users of the executable file is present in a repository. Any feedback identified for the executable file in the repository is presented using a presentation system. A product is then made for user input as to whether the executable file should be run after presenting the feedback.

Figure 3:
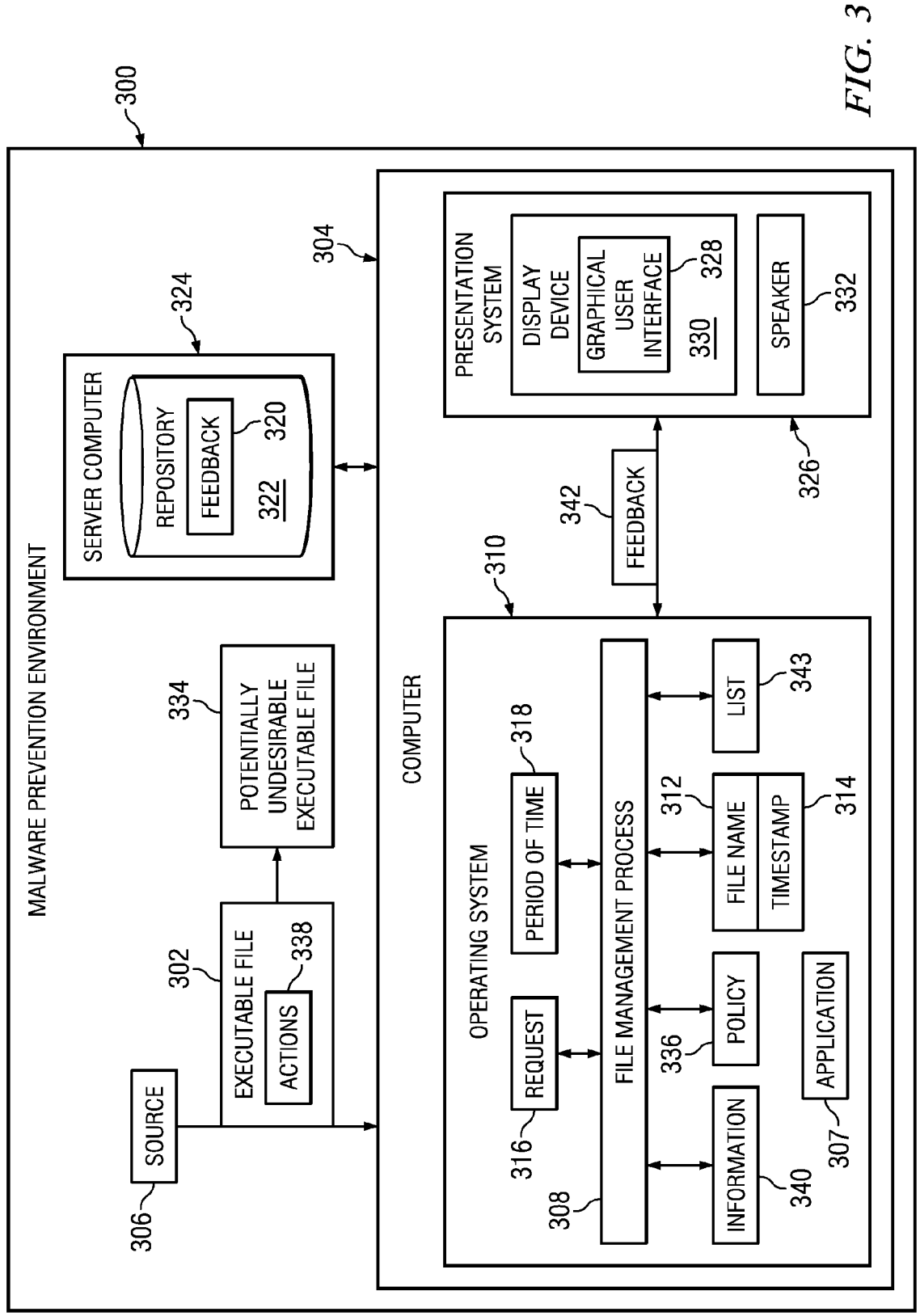
FIG. 3 is an illustration of a malware prevention environment in accordance with an illustrative embodiment.

With reference now to FIG. 3, an illustration of a malware prevention environment is depicted in accordance with an illustrative embodiment. Malware prevention environment 300 may be implemented using a network data processing system, such as network data processing system 100 in FIG. 1. The different processes illustrated in malware prevention environment 300 may be implemented using data processing systems, such as data processing system 200 in FIG. 2.

As illustrated, executable file 302 may be downloaded to computer 304 from source 306. Source 306 may be, for example, a website, a file transfer protocol server, or some other suitable type of source. Executable file 302 is used to install application 307. Executable file 302 may contain code needed to install application 307. In other illustrative examples, executable file 302 also may download additional files or code needed to install application 307.

In these illustrative examples, file management process 308 runs in the background and manages executable files. In the different illustrative embodiments, file management process 308 is part of operating system 310 running on computer 304. For example, when executable file 302 is downloaded to computer 304 from source 306, file management process 308 records file name 312 for executable file 302 and timestamp 314. Timestamp 314 is the time and date when executable file 302 was downloaded to computer 304.

In response to request 316 to run executable file 302, file management process 308 determines whether executable file 302 was downloaded to computer 304 within period of time 318 associated with a recent download. Period of time 318 may have various values. For example, without limitation, period of time 318 may be five minutes, 15 minutes, six hours, or some other suitable period of time. In these illustrative examples, period of time 318 may be set by a user.

If executable file 302 is identified as being downloaded within period of time 318, executable file 302 is considered a recent download. In response to this identification of executable file 302 as a recent download, file management process 308 determines whether feedback 320 for executable file 302 from a number of users is present in repository 322.

Repository 322 is a collection of information. In these examples, repository 322 is a collection of feedback from different users of executable files. This type of feedback is in contrast to identifications of malware in a repository from a single source. In these examples, a single source may be in organizations, such as a company that distributes virus scanning programs, adware detection programs, and other types of programs. Of course, repository 322 also may include feedback from single source organizations in addition to users of executable files.

Repository 322, in these examples, is a centralized repository. In some illustrative examples, multiple copies of repository 322 may be present for access by file management processes. In these illustrative examples, repository 322 is located in a remote location, such as on server computer 324.

If feedback 320 is present for executable file 302, feedback 320 is presented on presentation system 326 for computer 304. Presentation system 326 may be graphical user interface 328 presented on display device 330. In other illustrative examples, presentation system 326 also may include speaker 332 in addition to or in place of display device 330.

Feedback 320 may be presented visually and/or audibly to a user at computer 304. File management process 308 prompts for user input as to whether executable file 302 should be run after presenting feedback 320 on presentation system 326.

In response to a user input to run executable file 302, file management process 308 determines whether executable file 302 is potentially undesirable executable file 334. In these illustrative examples, file management process 308 performs this determination using policy 336. Policy 336 is a number of rules in these depicted examples. Policy 336 also may include values for parameters or other data needed to perform the evaluation of executable file 302.

The rules in policy 336 may include, for example, without limitation, whether the file was downloaded with a browser within the last five minutes and/or whether the file name of the executable file includes substrings "set up" and/or "install". Policy 336 also may include a rule to determine whether executable file 302 includes a process to access windowing application programming interfaces in operating system 310. Additionally, the user may create or select rules in policy 336.

If file management process 308 identifies executable file 302 as potentially undesirable executable file 334, file management process 308 monitors the running of executable file 302, while executable file 302 performs actions 338. Actions 338 are actions performed by executable file 302 to install application 307. File management process 308 identifies information 340 about actions 338 such that information 340 may be used to undo actions 338 at a later time to uninstall application 307.

Actions 338 may include, for example, without limitation, application programming interfaces used, input/output actions performed, file accesses performed, and/or other suitable types of actions to obtain information needed to undo actions 338. Information 340 may include files, such as dynamic link libraries, configuration files, and/or other files that may be deleted or replaced by executable file 302 when performing actions 338.

Additionally, in these illustrative examples, file management process 308 also includes a feature in which users may generate feedback 342 for executable file 302. For example, when application 307 is installed by running executable file 302, application 307 may be added to list 343. List 343 is a list of applications that have been installed that also have been identified as being potentially undesirable executable file 334. The user may select an application from list 343 corresponding to executable file 302 to generate feedback 342.

In response to a user input, selecting executable file 302 from list 343, graphical user interface 328 may receive user input for feedback 342. Feedback 342 is then sent to repository 322 by file management process 308. In this manner, different users may generate feedback 342 about their experiences with executable file 302, as well as other executable files. This type of feedback may provide information that is desired by a user to determine whether to run executable file 302.

In this manner, a user may determine whether to run executable file 302 based on information that the user may need from feedback generated by other users. In addition, the information in repository 322 also may be used by various entities in identifying what type of software is being used by different users. As a result, various marketing entities may identify a segment that a user belongs to based on the software used by a user.

The illustration of malware prevention environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, file management process 308 is illustrated as being a component within operating system 310 in these illustrative examples. In other illustrative examples, file management process 308 may be a program or other process running within operating system 310 rather than being part of operating system 310. As yet another example, in some illustrative examples, file management process 308 may run on a data processing system other than computer 304. For example, file management process 308 may run on a processor unit located in a mobile phone, a game console, or some other suitable type of data processing system.

Although in this illustrative example, file management process 308 identifies whether executable file 302 is potentially undesirable executable file 334, other illustrative examples may not require this step. For example, in other illustrative examples, file management process 308 may monitor the running of all executable files regardless of whether they are potentially undesirable executable files. In this manner, all executable files may be tracked, and feedback may be obtained from all of the executable files run by a user.

Figure 4:
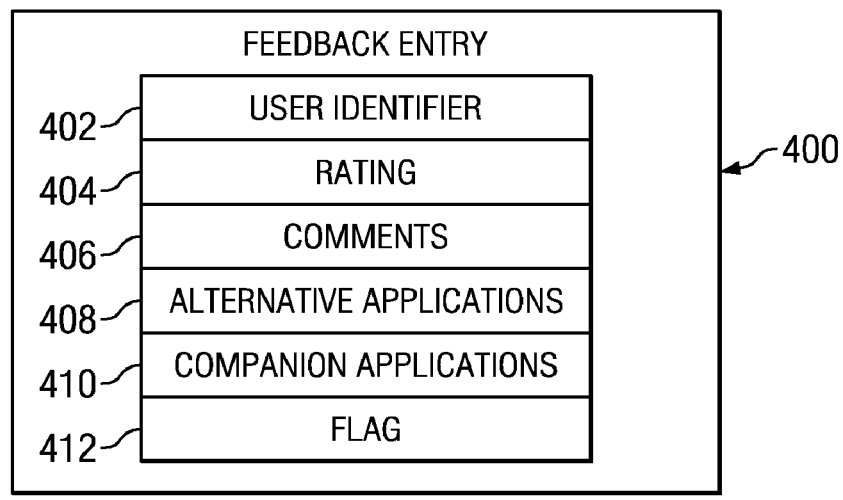
FIG. 4 is an illustration of a feedback entry in a repository in accordance with an illustrative embodiment.

With reference now to FIG. 4, an illustration of a feedback entry in a repository is depicted in accordance with an illustrative embodiment. In this illustrative example, feedback entry 400 is an example of an entry that may be found in repository 322 in FIG. 3.

As depicted, feedback entry 400 includes user identifier 402, rating 404, comments 406, alternative applications 408, companion applications 410, and flag 412. User identifier 402 identifies the user generating the feedback. User identifier 402 may be a user identifier selected by a user, an email address, or some other suitable type of identifier.

Rating 404 provides a rating of the executable file. This rating may be, for example, a one- to five-star rating or some other type of rating scale or system. Comments 406 allow a user to provide comments about the application installed by the executable file. These comments may include, for example, without limitation, the ease of use of the application, whether the application is believed to contain malware, whether the application performs as desired, and other suitable feedback.

Alternative applications 408 may include identifications of other applications that may be used in place of the application installed by the executable file. Companion applications 410 may identify other executable files for other applications that may be useful to install along with the executable file. In these illustrative examples, an application is code for a process. This code may be, for example, without limitation, a program, a script, a plug-in, or some other suitable form of code for an application. Flag 412 is used to identify an executable file that may be malware, adware, a virus, or some other type of undesirable executable file.

Figure 5:
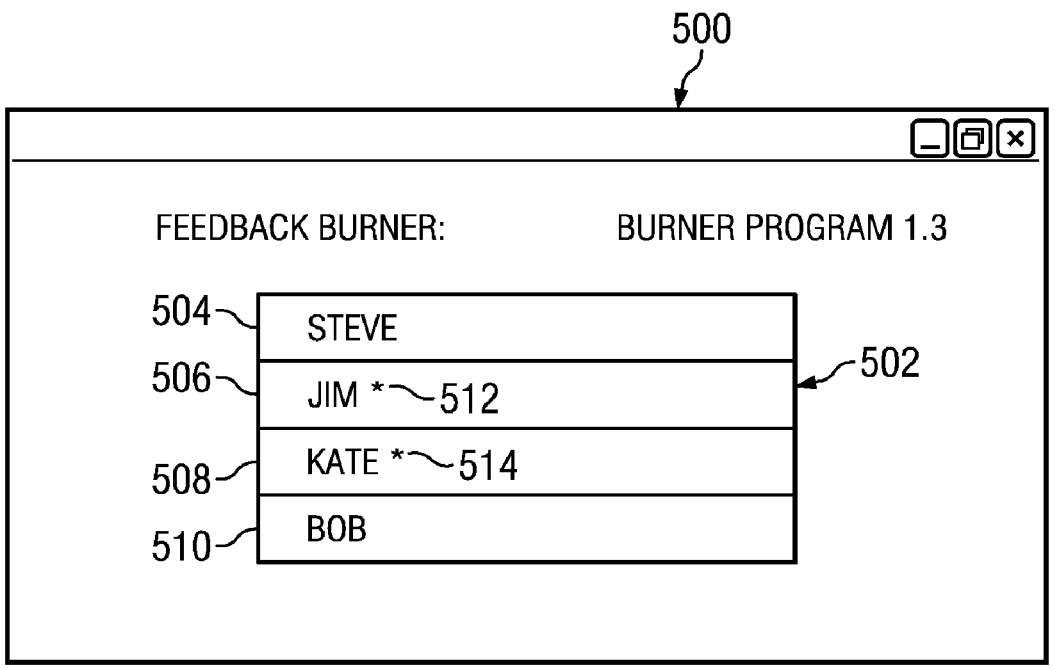
FIG. 5 is an illustration of a graphical user interface in accordance with an illustrative embodiment.

With reference now to FIG. 5, an illustration of a graphical user interface is depicted in accordance with an illustrative embodiment. In this illustrative example, window 500 is an example of a window that may be presented in graphical user interface 328 in FIG. 3.

As illustrated, window 500 displays a list of users for which feedback is present for an executable file. In this example, feedback is present for a burner program. Entries for feedback are displayed in section 502 of window 500. In this illustrative example, feedback is present from users in entries 504, 506, 508, and 510 in section 502.

A user may select one of these entries to obtain details of the feedback about the application. These entries also may include feedback from users in a contact list for the user running the executable file. A user may have more confidence in feedback from a user in the contact list as compared to users that the user does not know. In this depicted example, entry 506 and entry 508 include graphical identifier 512 and graphical identifier 514, respectively. These graphical identifiers indicate that the feedback in entries 506 and 508 are from users in a contact list.

Figure 6:
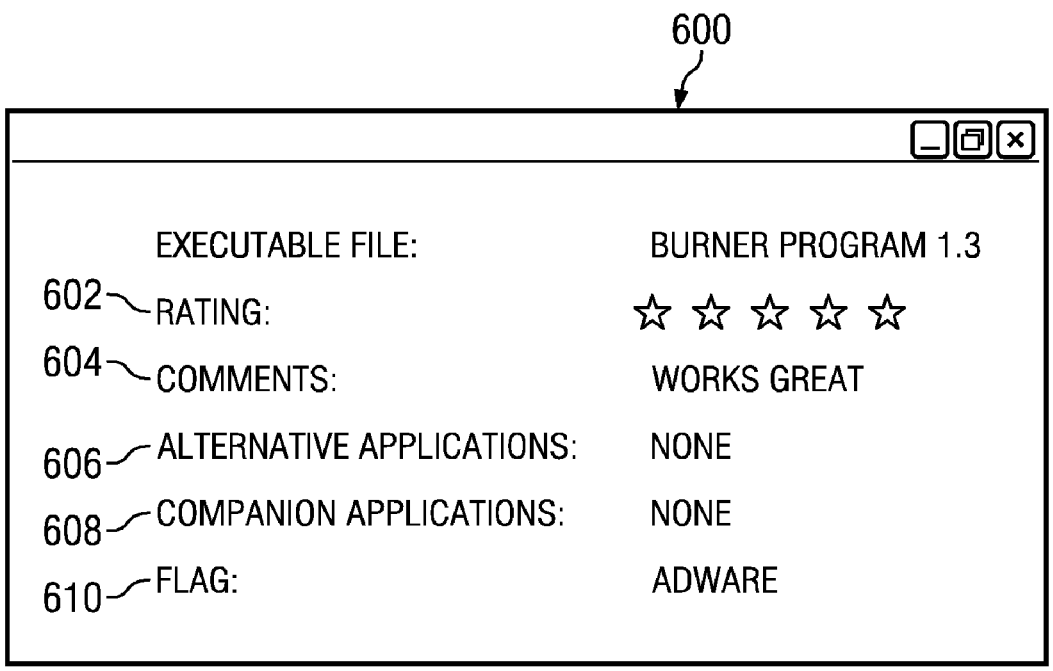
FIG. 6 is an illustration of a graphical user interface in accordance with an illustrative embodiment.

With reference now to FIG. 6, an illustration of a graphical user interface is depicted in accordance with an illustrative embodiment. In this illustrative example, window 600 is an example of a window that may be presented in graphical user interface 328 in FIG. 3. Window 600 is an example of feedback that may be presented in response to a selection of an entry from window 500 in FIG. 5. As illustrated, window 600 provides feedback about an executable file. In this example, window 600 identifies rating 602, comments 604, alternative applications 606, companion applications 608, and flag 610.

In this example, stars are used to rate the executable file. In this illustrative example, the executable file is for a burner application, and flag 610 indicates that adware is present in this executable file. With this information, a user may determine whether to go ahead and run the executable file or cancel the running of the executable file.

Figure 7:
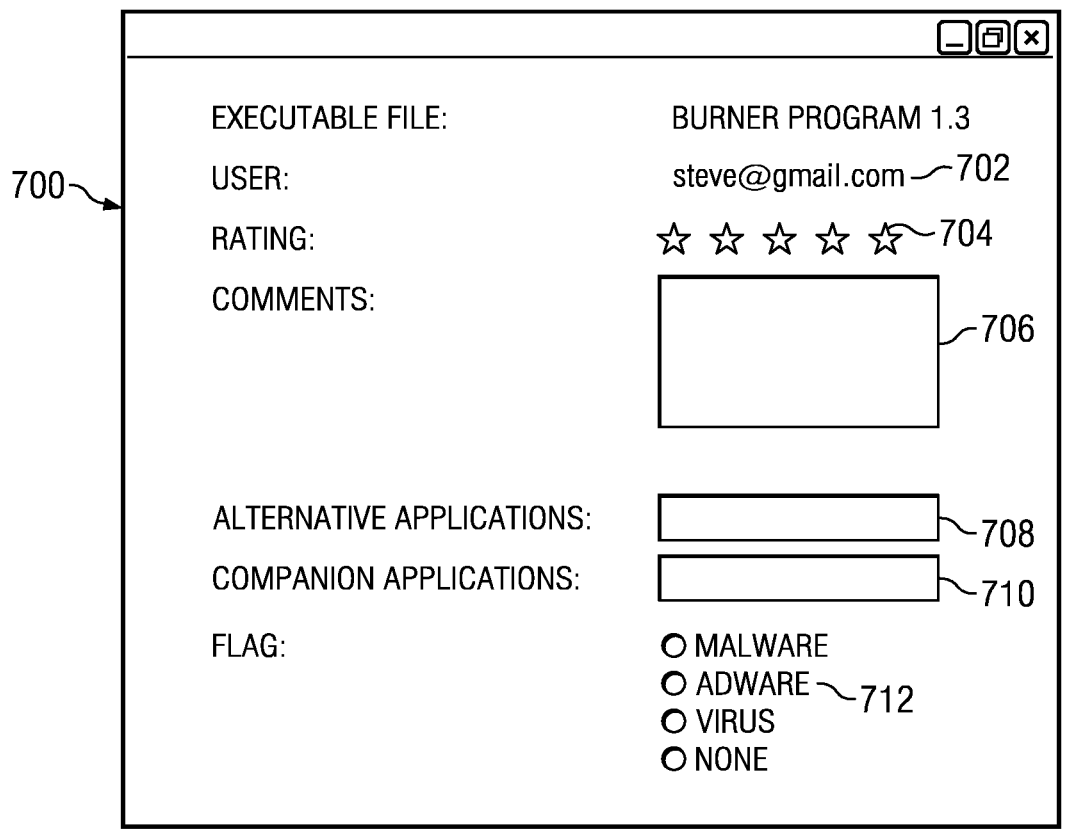
FIG. 7 is an illustration of a window for receiving feedback in accordance with an illustrative embodiment.

With reference now to FIG. 7, an illustration of a window for receiving feedback is depicted in accordance with an illustrative embodiment. In this illustrative example, window 700 is an example of a window that may be presented in graphical user interface 328 to receive feedback 342 in FIG. 3.

As depicted in this example, window 700 includes user identification field 702, rating field 704, comments field 706, alternative application field 708, companion application field 710, and flag indicators 712. User identification field 702 provides a field for entry of a user identification. In this example, the user identification may be an email address. Of course, some other user identification may be used. Rating field 704 allows a user to input the rating for the executable file. Comments field 706 allows a user to input comments or information about the application installed by the executable file.

Alternative application field 708 allows a user to enter input about other applications that may be used in place of the executable file. Companion application field 710 provides a field for a user to input information about other applications that may be used along with applications installed by the executable file. Flag indicators 712 allow the user to indicate whether the executable file is an undesirable executable file.

Figure 8:
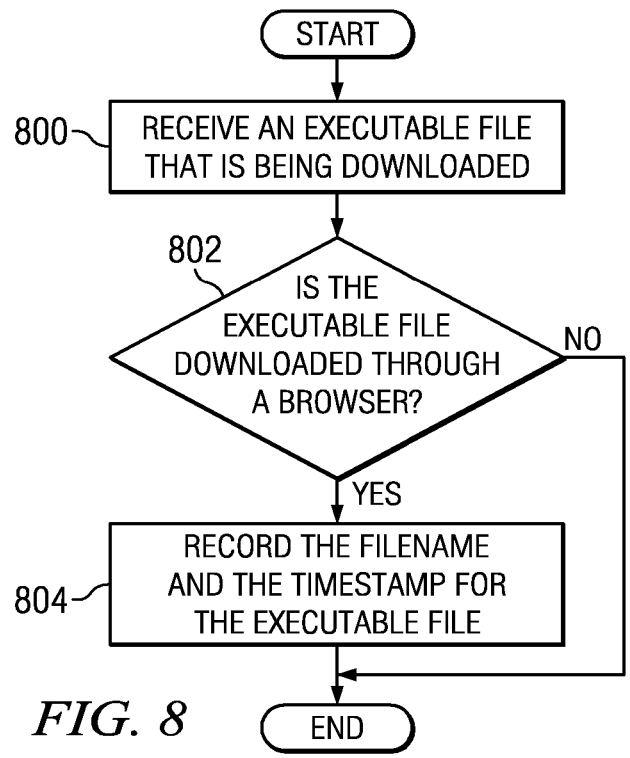
FIG. 8 is a flowchart of a process for downloading an executable file in accordance with an illustrative embodiment.

With reference now to FIG. 8, a flowchart of a process for downloading an executable file is depicted in accordance with an illustrative embodiment. In this example, the process in FIG. 8 may be implemented within file management process 308 in FIG. 3.

The process begins by receiving an executable file that is being downloaded (step 800). A determination is made as to whether the executable file is downloaded through a browser (step 802). If the executable file is downloaded by a browser, the filename and the timestamp are recorded for the executable file (step 804), with the process terminating thereafter. The timestamp is the time and date of when the executable file was downloaded in these examples. With reference again to step 802, if the executable file is not downloaded by a browser, the process terminates.

Figure 9:
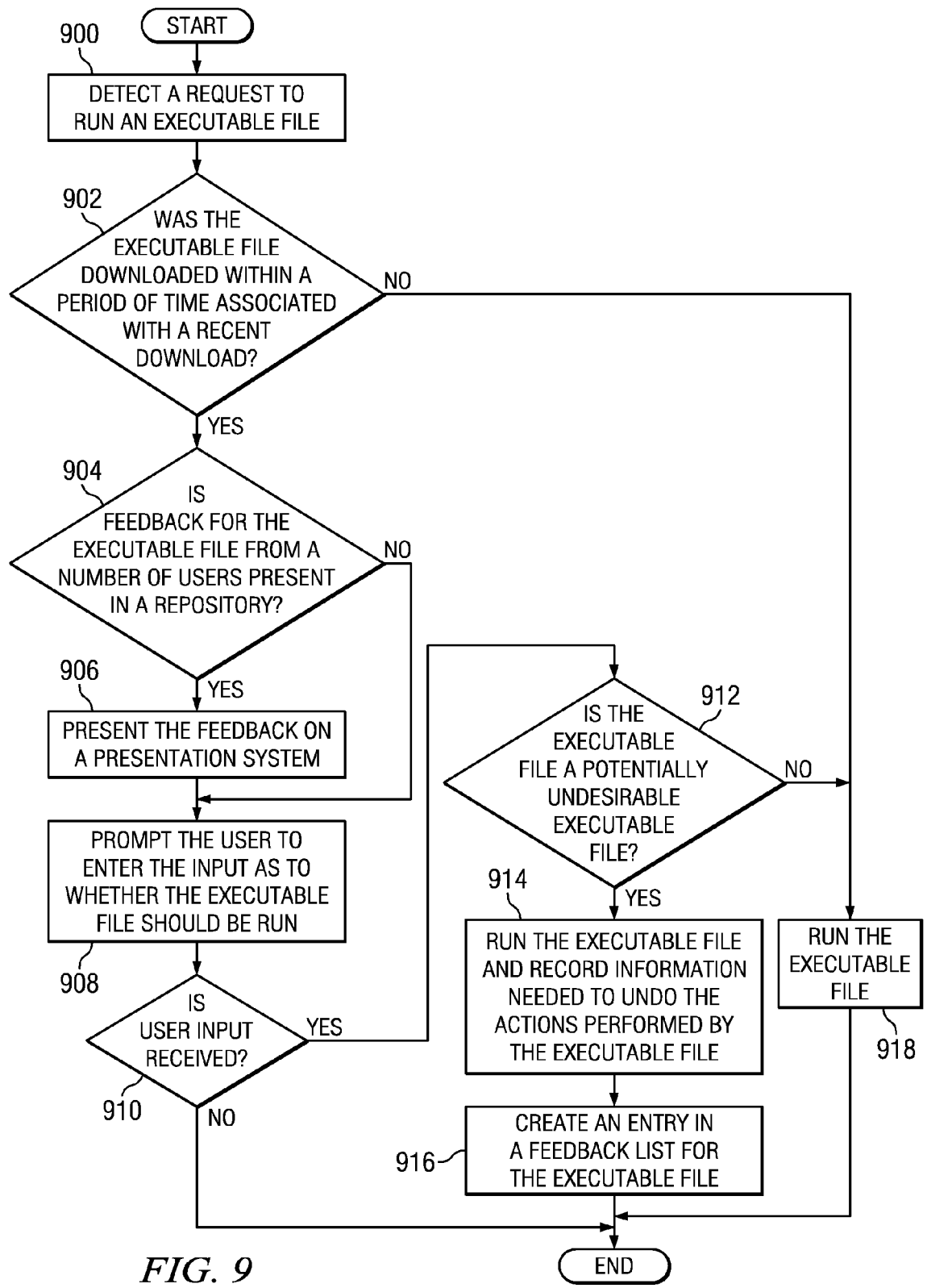
FIG. 9 is a flowchart of a process for running an executable file in accordance with an illustrative embodiment.

With reference now to FIG. 9, a flowchart of a process for running an executable file is depicted in accordance with an illustrative embodiment. The process illustrated in FIG. 9 may be implemented in file management process 308 in FIG. 3.

The process begins by detecting a request to run an executable file (step 900). Step 900 may be detected in response to a user selecting an executable file to be run. A determination is then made as to whether the executable file was downloaded within a period of time associated with a recent download (step 902). This determination may be made by comparing the current time with the timestamp for the executable file. The period of time may have a number of different values. For example, the period of time may be five minutes.

If the executable file was downloaded to the computer within the period of time, the process determines whether feedback for the executable file from a number of users of the executable file is present in a repository (step 904). A user of the executable file is a user who has run the executable file to install an application. This determination may be made by accessing the repository. The repository, in these examples, is located on a remote computer. If feedback is present for the executable file, the feedback is presented on a presentation system (step 906). In these examples, the presentation system may be a graphical user interface displayed on a display device. In other illustrative examples, the presentation system may use a speaker to audibly present the feedback in addition to or in place of the graphical user interface.

The process then prompts the user to enter the input as to whether the executable file should be run (step 908). A determination is made as to whether user input is received to continue running the executable file (step 910). If user input is present to run the executable file, a determination is made as to whether the executable file is a potentially undesirable executable file (step 912).

If the executable file is a potentially undesirable executable file, the process then runs the executable file and records information needed to undo the actions performed by the executable file (step 914). The process then creates an entry in a feedback list for the executable file (step 916), with the process terminating thereafter.

With reference again to step 912, if the executable file is not identified as a potentially undesirable executable file, the process runs the executable file (step 918) and terminates. The process terminates in step 910 if the user does not elect to run the executable file. With reference again to step 904, if feedback is not present for the executable file, the process proceeds to step 908 as described above. With reference again to step 902, if the executable file was not downloaded within a period of time associated with the recent download, the process proceeds to step 918 as discussed above.

Figure 10:
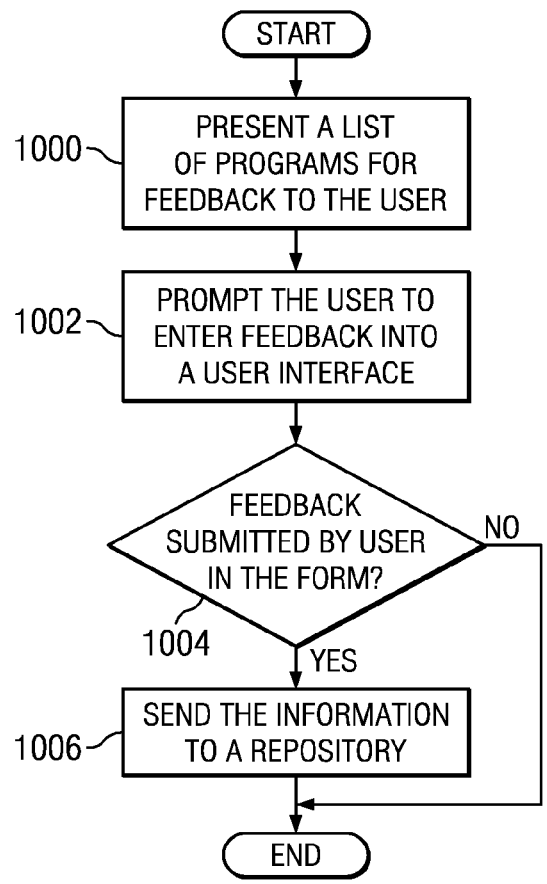
FIG. 10 is a flowchart of a process for generating feedback for an executable file in accordance with an illustrative embodiment.

With reference now to FIG. 10, a flowchart of a process for generating feedback for an executable file is depicted in accordance with an illustrative embodiment. The process illustrated in FIG. 10 may be implemented in file management process 308 in FIG. 3.

The steps in FIG. 10 may be performed in response to a user's selection of the executable file from a list of executable files. Further, this process may be performed when a user uninstalls the application installed by the executable file. This process may be performed when the user decides to undo actions performed by the executable file. Additionally, this feedback also may be obtained using these steps when the user uninstalls the application using an uninstall process provided by the application.

In this illustrative example, a list of programs for feedback is presented to the user (step 1000). In response to the selection of a program from the list of programs, the user is prompted to enter feedback into a user interface (step 1002). This user interface may be, for example, window 700 in FIG. 7.

The process then determines whether the user submits feedback in the form (step 1004). If the user submits feedback in the form, the information is sent to a repository (step 1006), with the process terminating thereafter. With reference again to step 1004, if the user does not submit feedback in the form, the process also terminates.

Figure 11:
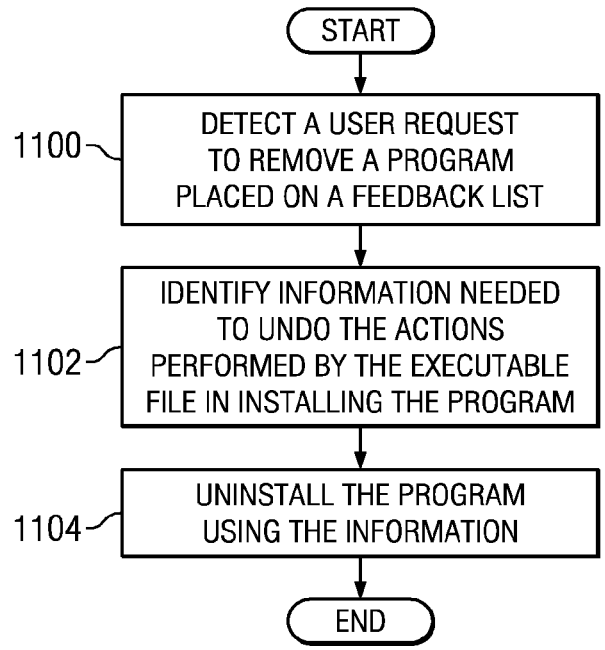
FIG. 11 is a flowchart of a process for removing a program in accordance with an illustrative embodiment.

With reference now to FIG. 11, a flowchart of a process for removing a program is depicted in accordance with an illustrative embodiment. The process illustrated in FIG. 11 may be implemented in file management process 308 in FIG. 3. This process may be used to remove a program installed by an executable file that has been identified as a potentially undesirable executable file.

The process begins by detecting a user request to remove a program placed on a feedback list (step 1100). The process identifies information needed to undo the actions performed by the executable file in installing the program (step 1102). The process then uninstalls the program using the information (step 1104), with the process terminating thereafter.

Figure 12:
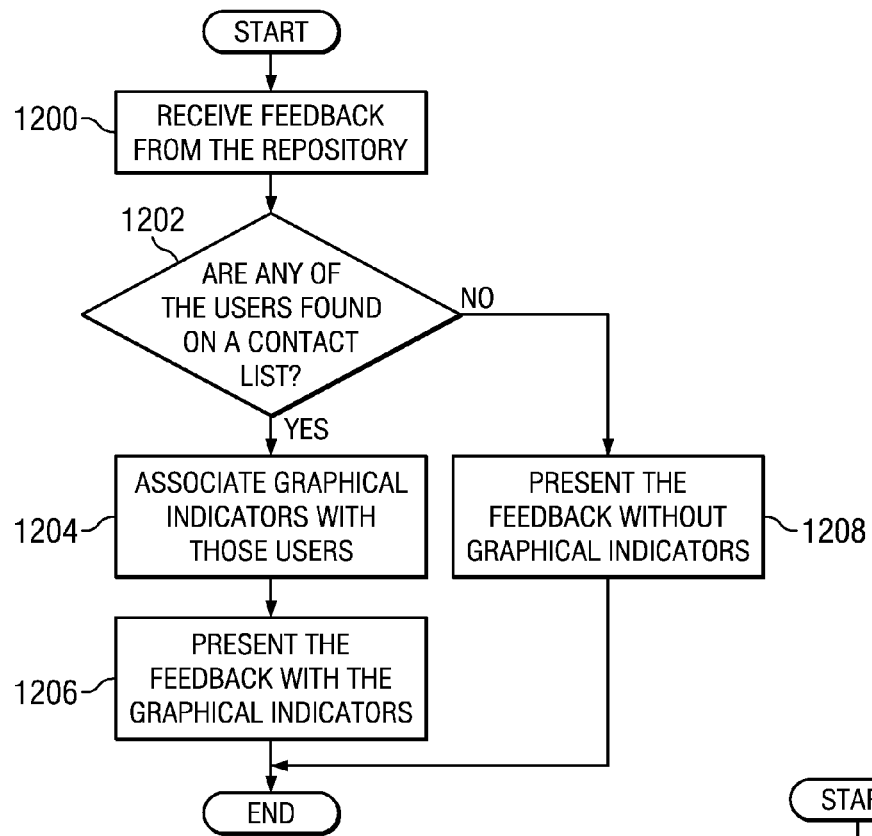
FIG. 12 is a flowchart of a process for identifying feedback for a presentation in accordance with an illustrative embodiment.

With reference now to FIG. 12, a flowchart of a process for identifying feedback for a presentation is depicted in accordance with an illustrative embodiment. In this illustrative example, the process may be implemented in file management process 308 in FIG. 3. This process may be used to identify feedback from users that the user trusts or has associations with in these examples. This process may be implemented as part of step 906 in FIG. 9.

The process begins by receiving feedback from the repository (step 1200). The process then determines whether any of the users are found on a contact list (step 1202). This contact list may be, for example, a chat address book, an email address book, contacts in a social network, or some other type of list of users. If users in the feedback received in the repository match those in a list, graphical indicators are associated with those users (step 1204). The process then presents the feedback with the graphical indicators (step 1206), with the process terminating thereafter. In these examples, the graphical indicator may be, for example, without limitation, highlighting, bold text, an icon, a change in color in the text, a change in font size, or some other suitable type of graphical indicator.

With reference again to step 1202, if users on a contact list are not found, the process presents the feedback without graphical indicators (step 1208), with the process terminating thereafter.

Figure 13:
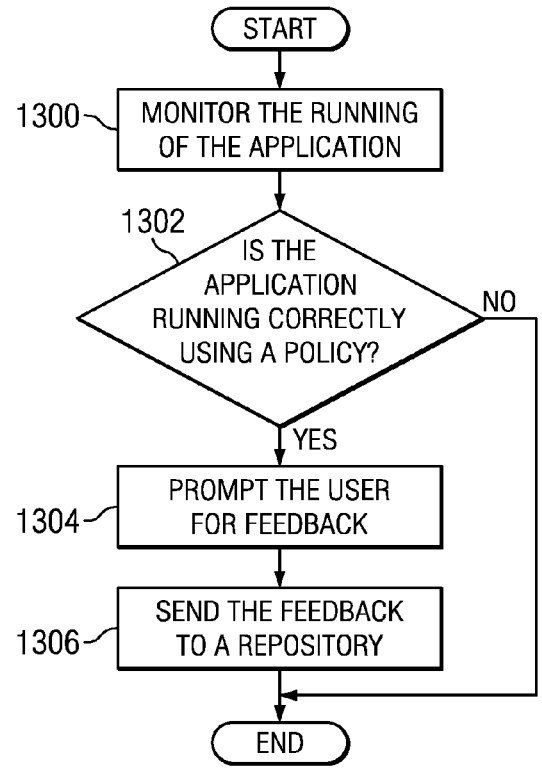
FIG. 13 is an illustration of a flowchart for obtaining feedback in accordance with an illustrative embodiment.

With reference now to FIG. 13, an illustration of a flowchart for obtaining feedback is depicted in accordance with an illustrative embodiment. The process illustrated in FIG. 13 may be implemented in file management process 308 in FIG. 3. This process may be used to obtain feedback if an application is identified as having problems or not operating according to a policy.

The process begins by monitoring the running of the application (step 1300). A determination is made as to whether the application is running correctly using a policy (step 1302). The policy, in this example, is a set of rules that identifies when feedback may be needed for an application.

For example, the policy may state that feedback is needed if the application has been terminated by the operating system or has unexpectedly stopped running more than some number of times. The policy also may indicate that feedback is needed if the application uses more than some threshold level of resources. An example of a threshold level may be if the application uses memory that is greater than some threshold level or processor time that is greater than some threshold level. Further, the policy may state that feedback is needed if the thresholds are exceeded greater than some number of times.

Additionally, a user may adjust the policy as to when feedback may be obtained. For example, the user may set the number of times that a threshold is exceeded, as well as the threshold level. For example, the user may set the number of times to be three times and the threshold level to be when the application uses more than 10 percent of the memory in the computer.

If feedback is needed, the process then prompts the user for feedback (step 1304). This feedback may be received using a user interface, such as that in window 700 in FIG. 7. Thereafter, the feedback is sent to a repository (step 1306), with the process terminating thereafter. In step 1302, if feedback is not needed, the process terminates.

Thus, the different illustrative embodiments provide a method and apparatus for managing executable files. In one or more illustrative embodiments, in response to detecting a request to run an executable file on a computer, a determination is made as to whether the executable file is downloaded by the computer within a period of time associated with the recent download. In response to a determination that the executable file was downloaded to the computer within the period of time, a determination is made as to whether feedback of the executable file from a number of users is present in a repository. If feedback entered by a number of users for the executable file is present, this feedback is presented using a presentation system. The process then prompts the user for input as to whether the executable file should be run after presenting the feedback.

In this manner, a user may be more able to make an informed decision about whether to run an executable file. This decision may be made with the feedback generated by other users of the executable file. Additionally, the different illustrative embodiments also provide a capability to undo actions performed by the executable file if the executable file is identified as a potentially undesirable executable file. Further, the different illustrative embodiments provide a user a capability to generate feedback for the executable file. In this manner, a repository of feedback is created from different user's experiences with the particular executable file.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any data processing system that runs program code. For the purposes of this description, a computer usable or computer readable medium can be any tangible apparatus that can contain, store, communicate, propagate, or transport the program for use by or in connection with the data processing system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running of the program code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem, and Ethernet cards are just a few of the currently available types of network adapters.

The description of the present invention has been presented for purposes of illustration and description, and it is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing executable files, the method comprising:
    detecting a request to run an executable file on a computer;
    responsive to detecting the request to run the executable file on the computer, determining, by a processor unit, whether the executable file was downloaded to the computer within a period of time associated with a recent download;
    responsive to a determination that the executable file was downloaded to the computer within the period of time, determining, by the processor unit, whether feedback for the executable file from a number of users of the executable file is present in a repository;
    presenting, by the processor unit, the feedback identified for the executable file in the repository using a presentation system;
    prompting, by the processor unit, for user input as to whether the executable file should be run after presenting the feedback;
    monitoring the running of an application installed using the executable file;
    responsive to the running of the application, determining whether to obtain a second user input about the executable file using a policy;
    responsive to a determination that the second user input should be obtained, prompting a user for the second user input about the executable file; and
    responsive to receiving the second user input, sending the second user input to the repository.

2. The method of claim 1 further comprising:
    responsive to the user input to run the executable file, determining whether the executable file is a potentially undesirable executable file; and
    responsive to a determination that the executable file is the potentially undesirable executable file, identifying information for undoing actions performed by the executable file.

3. The method of claim 2, wherein the step of responsive to the determination that the executable file is the potentially undesirable executable file, identifying the information for undoing the actions performed by the executable file comprises:
    responsive to the determination that the executable file is the potentially undesirable executable file, monitoring the actions performed by the executable file; and
    recording the information needed to undo the actions performed by the executable file.

4. The method of claim 2, wherein the step of responsive to the user input to run the executable file, determining whether the executable file is the potentially undesirable executable file comprises:
    responsive to the user input to run the executable file, determining whether the executable file is the potentially undesirable executable file using a policy.

5. The method of claim 2, wherein the user input is a first user input and further comprising:
    responsive to a third user input to undo the actions performed by the executable file, undoing the actions performed by the executable file using the information.

6. The method of claim 1, wherein the user input is first user input and further comprising:
    presenting an interface for receiving the second user input about the executable file; and
    responsive to receiving the second user input through the interface, sending the second user input to the repository.

7. The method of claim 6 further comprising:
    responsive to the second user input, presenting an interface for receiving third user input about the executable file; and
    responsive to receiving the third user input through the interface, sending the third user input to the repository.

8. The method of claim 1, wherein the presentation system comprises a graphical user interface.

9. The method of claim 1, wherein the presentation system comprises at least one of a display device and a speaker.

10. The method of claim 1, wherein the steps of detecting, determining, presenting, and prompting are performed by an operating system running on the processor unit.

11. A computer comprising:
- a bus;
- a memory connected to the bus, wherein program code is stored in the memory;
- a processor unit, wherein the processor unit runs the program code to determine whether an executable file was downloaded to the computer within a period of time associated with a recent download in response to detecting a request to run the executable file on the computer; determine whether feedback for the executable file from a number of users of the executable file is present in a repository in response to a determination that the executable file was downloaded to the computer within the period of time; present the feedback identified for the executable file in the repository using a presentation system; prompt for user input as to whether the executable file should be run after presenting the feedback; monitor the running of an application installed using the executable file; responsive to the running of the application, determine whether to obtain a second user input about the executable file using a policy; responsive to a determination that the second user input should be obtained, prompt a user for the second user input about the executable file; and responsive to receiving the second user input, send the second user input to the repository.

12. The computer of claim 11, wherein the processor unit further runs the program code to determine whether the executable file is a potentially undesirable executable file in response to the user input to run the executable file; and identify information for undoing actions performed by the executable file in response to a determination that the executable file is the potentially undesirable executable file.

13. The computer of claim 12, wherein in running the program code to identify the information for undoing the actions performed by the executable file in response to the determination that the executable file is the potentially undesirable executable file, the processor unit runs the program code to monitor the actions performed by the executable file in response to the determination that the executable file is the potentially undesirable executable file and record the information needed to undo the actions performed by the executable file.

14. The computer of claim 12, wherein in determining whether the executable file is the potentially undesirable executable file in response to the user input to run the executable file, the processor unit runs the program code to determine whether the executable file is the potentially undesirable executable file using a policy in response to the user input to run the executable file.

15. The computer of claim 12, wherein the user input is a first user input and the processor unit further runs the program code to undo the actions performed by the executable file using the information in response to a third user input to undo the actions performed by the executable file.

16. The computer of claim 15, wherein the processor unit further runs the program code to present an interface for receiving the third user input in response to the third user input and send the third user input to the repository in response to receiving the third user input through the interface.

17. The computer of claim 11, wherein the user input is first user input and the processor unit further runs the program code to present an interface for receiving the second user input and send the second user input to the repository in response to receiving the second user input through the interface.

18. A computer program product comprising:
- a tangible computer readable storage device;
- program code, stored on the tangible computer readable storage device, for determining whether an executable file was downloaded to a computer within a period of time associated with a recent download in response to detecting a request to run the executable file on the computer;
- program code, stored on the tangible computer readable storage device, for determining whether feedback for the executable file from a number of users of the executable file is present in a repository in response to a determination that the executable file was downloaded to the computer within the period of time;
- program code, stored on the tangible computer readable storage device, for presenting the feedback identified for the executable file in the repository using a presentation system;
- program code, stored on the tangible computer readable storage device, for prompting for user input as to whether the executable file should be run after presenting the any feedback;
- program code, stored on the tangible computer readable storage device, for monitoring the running of an application installed using the executable file;
- program code, stored on the tangible computer readable storage device and responsive to the running of the application, for determining whether to obtain a second user input about the executable file using a policy;
- program code, stored on the tangible computer readable storage device and responsive to a determination that the second user input should be obtained, for prompting a user for the second user input about the executable file; and
- program code, stored on the tangible computer readable storage device, and responsive to receiving the second user input, for sending the second user input to the repository.

19. The computer program product of claim 18 further comprising:
- program code, stored on the tangible computer readable storage device, for determining whether the executable file is a potentially undesirable executable file in response to the user input to run the executable file; and
- program code, stored on the tangible computer readable storage device, for identifying information for undoing actions performed by the executable file in response to a determination that the executable file is the potentially undesirable executable file.

20. The computer program product of claim 19, wherein the program code, stored on the tangible computer readable storage device, for identifying the information for undoing the actions performed by the executable file in response to the determination that the executable file is the potentially undesirable executable file, further comprises:
- program code, stored on the tangible computer readable storage device, for monitoring the actions performed by the executable file in response to the determination that the executable file is the potentially undesirable executable file and recording the information needed to undo the actions performed by the executable file.

21. The computer program product of claim 19, wherein the program code, stored on the tangible computer readable storage device, for determining whether the executable file is the potentially undesirable executable file in response to the user input to run the executable file further comprises:

program code, stored on the tangible computer readable storage device, for determining whether the executable file is the potentially undesirable executable file using a policy in response to the user input to run the executable file.

22. The computer program product of claim 19, wherein the user input is a first user input and further comprising:

program code, stored on the tangible computer readable storage device, for undoing the actions performed by the executable file using the information in response to a third user input to undo the actions performed by the executable file.

23. The computer program product of claim 22 further comprising:

program code, stored on the tangible computer readable storage device, for presenting an interface for receiving the third user input in response to the third user input; and program code, stored on the tangible computer readable storage device, for sending the third user input to the repository in response to receiving the third user input through the interface.

24. The computer program product of claim 18, wherein the user input is first user input and further comprising:

program code, stored on the tangible computer readable storage device, for presenting an interface for receiving the second user input; and program code, stored on the tangible computer readable storage device, for sending the second user input to the repository in response to receiving the second user input through the interface.

* * * * *